(12) United States Patent
Rajantie et al.

(10) Patent No.: US 8,318,373 B2
(45) Date of Patent: Nov. 27, 2012

(54) FUEL CELL ASSEMBLY

(75) Inventors: Hanna Katariina Rajantie, Reading (GB); Jonathan David Brereton Sharman, Oxon (GB); David Thompsett, Reading (GB); David Emmerson Brown, Surrey (GB); Stephen Robert Tennison, Surrey (GB); Beverley Sowerby, Bath (GB); Vlad Strelko, Basingstoke (GB)

(73) Assignee: Johnson Matthey Fuel Cells Limited, London (GB)

( * ) Notice: Subject to any disclaimer, the term of this patent is extended or adjusted under 35 U.S.C. 154(b) by 755 days.

(21) Appl. No.: 12/440,691

(22) PCT Filed: Sep. 11, 2007

(86) PCT No.: PCT/GB2007/050534
§ 371 (c)(1),
(2), (4) Date: Sep. 3, 2009

(87) PCT Pub. No.: WO2008/032115
PCT Pub. Date: Mar. 20, 2008

(65) Prior Publication Data
US 2010/0009232 A1    Jan. 14, 2010

(30) Foreign Application Priority Data
Sep. 11, 2006   (GB) .................................. 0617806.5

(51) Int. Cl.
*H01M 8/10* (2006.01)
(52) U.S. Cl. ........ 429/483; 429/492; 429/517; 429/519; 429/523
(58) Field of Classification Search .......... 429/480–483, 429/492–494, 497, 517, 519, 521, 523
See application file for complete search history.

(56) References Cited

U.S. PATENT DOCUMENTS 5,346,780 A * 9/1994 Suzuki .......................... 429/480
(Continued)

FOREIGN PATENT DOCUMENTS

DE           103 42 199 A1    4/2005
(Continued)

*Primary Examiner* — Joseph Drodge
(74) *Attorney, Agent, or Firm* — RatnerPrestia

(57) ABSTRACT

An MEA comprising: (i) a central first conductive gas diffusion substrate having a first face and a second face; (ii) first and second catalyst layers each having a first and second face and wherein the first face of the first catalyst layer is in contact with the first face of the gas diffusion substrate and the first face of the second catalyst layer is in contact with the second face of the gas diffusion substrate; (iii) first and second electrolyte layers each having a first and second face and wherein the first face of the first electrolyte layer is in contact with the second face of the first catalyst layer and the first face of the second electrolyte layer is in contact with the second face of the second catalyst layer; (iv) third and fourth catalyst layers each having a first and second face and wherein the first face of the third catalyst layer is in contact with the second face of the first electrolyte layer and the first face of the fourth catalyst layer is in contact with the second face of the second electrolyte layer; and (v) first and second porous current collecting means each having a thickness of less than 400 m, and each having a first and second face and wherein the first face of the first current collecting means is in contact with the second face of the third catalyst layer and the first face of the second current collecting means is in contact with the second face of the fourth catalyst layer is disclosed and a fuel cell comprising such an MEA.

26 Claims, 4 Drawing Sheets

Schematic drawing of a planar MEA according to the invention.

U.S. PATENT DOCUMENTS

| | | | |
|---|---|---|---|
| 5,432,023 A | 7/1995 | Yamada et al. | |
| 5,800,938 A * | 9/1998 | Watanabe | 429/485 |
| 5,858,569 A * | 1/1999 | Meacher et al. | 429/413 |
| 5,922,486 A | 7/1999 | Chiao | |
| 6,001,500 A * | 12/1999 | Bass et al. | 429/484 |
| 7,081,317 B2 * | 7/2006 | Fujii et al. | 429/432 |
| 7,157,176 B2 * | 1/2007 | Tanuma | 429/483 |
| 7,416,809 B2 * | 8/2008 | Narayanan et al. | 429/483 |
| 7,713,899 B2 * | 5/2010 | Hampden-Smith et al. | 502/101 |
| 7,803,496 B2 * | 9/2010 | Koyama et al. | 429/513 |
| 7,993,499 B2 * | 8/2011 | Zuber et al. | 204/252 |
| 2003/0198853 A1 | 10/2003 | Choi et al. | |
| 2004/0214073 A1 | 10/2004 | Karuppaiah et al. | |
| 2005/0112449 A1 | 5/2005 | Mathias et al. | |
| 2006/0150398 A1 * | 7/2006 | Brunk et al. | 29/623.2 |
| 2006/0257717 A1 * | 11/2006 | Huang | 429/44 |
| 2007/0054175 A1 | 3/2007 | Maendle et al. | |
| 2007/0184336 A1 * | 8/2007 | Kim et al. | 429/44 |
| 2008/0124597 A1 * | 5/2008 | Murata et al. | 429/26 |

FOREIGN PATENT DOCUMENTS

| | | |
|---|---|---|
| EP | 0 731 520 A1 | 9/1996 |
| EP | 0 875 524 A2 | 11/1998 |
| EP | 0 875 524 A3 | 11/1998 |
| WO | WO-02/15308 A2 | 2/2002 |
| WO | WO-02/15308 A3 | 2/2002 |
| WO | WO-2005/027244 A2 | 3/2005 |
| WO | WO-2005/027244 A3 | 3/2005 |
| WO | WO-2006/032894 A2 | 3/2006 |

* cited by examiner

Schematic drawing of a planar MEA according to the invention.

Schematic drawing of a tubular MEA according to the invention.

Figure 3. Schematic diagram showing the wall and channel dimensions of the carbon monolith.
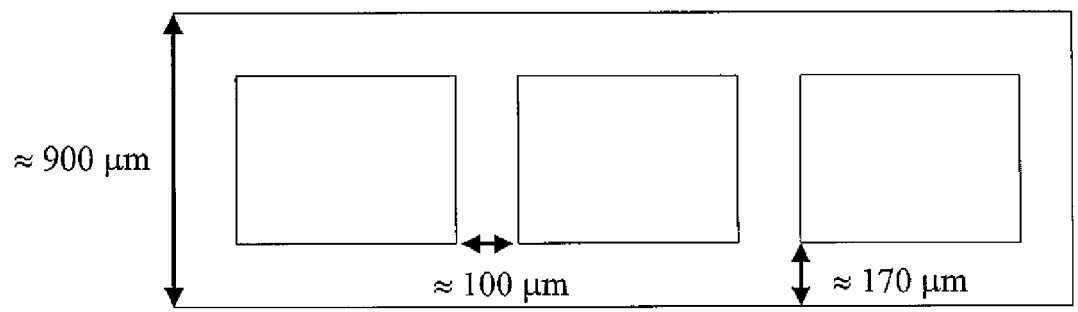

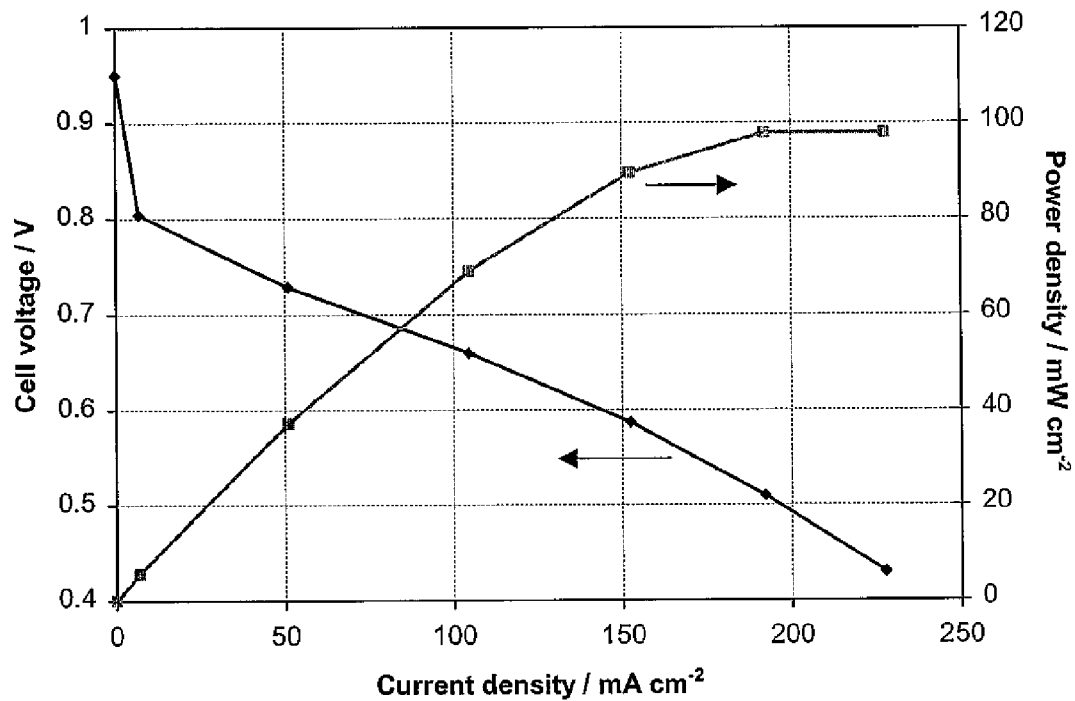
Figure 4. Air polarisation (black) and power density (grey) curves for the air-breathing hydrogen fuel cell.

FUEL CELL ASSEMBLY

CROSS-REFERENCE TO RELATED APPLICATIONS

This application is the U.S. National Phase application of PCT International Application No. PCT/GB2007/050534, filed Sep. 11, 2007, and claims priority of British Patent Application No. 0617806.5, filed Sep. 11, 2006, both of which are incorporated herein by reference.

FIELD OF THE INVENTION

The present invention concerns an assembly for use in a fuel cell, and more especially concerns a membrane electrode assembly of unique construction.

BACKGROUND OF THE INVENTION

A fuel cell is an electrochemical cell comprising two catalysed electrodes separated by an electrolyte. A fuel, especially hydrogen (including hydrogen-containing "reformate") or methanol, is supplied to an anode, and an oxidant, e.g. oxygen or air, is supplied to the cathode. Electrochemical reactions occur at the electrodes, and the chemical energy of the fuel and the oxidant is converted into electrical energy and heat. Fuel cells are a clean and efficient power source, and may replace traditional power sources such as the internal combustion engine (including gas turbines) in stationary and automotive applications or energy storage batteries in portable power consuming devices. The first bulk applications of fuel cell stacks are now on the market as auxiliary power sources for high-end boats and recreational vehicles. Extensive research into fuel cells continues, and fuel cells are being mooted as battery replacements to provide increased energy density power sources in laptop-type computers, mobile phones and similar small electronic devices.

The principal type of fuel cell is the Polymer Electrolyte Membrane (PEM) cell. In this, the electrolyte is a solid polymer membrane which is electronically insulating but ionically-conducting. Proton-conducting membranes based on perfluorosulphonic materials are typically used, although many other membranes are being investigated. Protons produced at the anode are transported across the membrane to the cathode, where they combine with oxygen to produce water.

The main component of the PEM fuel cell is the membrane electrode assembly (MEA) and a state of the art MEA has five layers. The central layer is a polymer membrane, and on either side of the membrane is an electrocatalyst layer which is tailored for the different requirements at the anode and the cathode. Finally, adjacent each catalyst layer there is a gas diffusion substrate. The gas diffusion substrate must allow the reactants to reach the electrocatalyst layer and also must conduct the electric current that is generated by the electrochemical reactions. Therefore, the substrate must be porous and electrically conducting. The components are bonded and sealed together to form an MEA which is built up into complete cells together with rigid flow field plates which distribute fuel and oxidant gases and remove water. A number of cells comprising MEAs and their associated flow field plates are assembled together to form a fuel cell stack.

The MEA can be assembled by several methods known in the art. The electrocatalyst ("catalyst") layer may be applied to the gas diffusion substrate to form a gas diffusion electrode. Two such electrodes can be placed on either side of a membrane and laminated together. Another method is to coat the two catalysts on either side of the membrane to form a catalyst-coated membrane (CCM), apply a gas diffusion substrate to both faces of the catalyst-coated membrane, followed by laminating. A further method is a combination method, using a one-sided catalyst coated membrane with a gas diffusion substrate, and on the other side of the membrane, a gas diffusion electrode.

Despite the advances made in MEAs and fuel cells generally, there remains a need for alternative constructions offering yet further efficiencies, but also satisfying the requirement to further reduce costs and/or size of the fuel cell stack.

SUMMARY OF THE INVENTION

The present invention provides an MEA comprising:
(i) a central first conductive gas diffusion substrate having a first face and a second face;
(ii) first and second catalyst layers each having a first and second face and wherein the first face of the first catalyst layer is in contact with the first face of the gas diffusion substrate and the first face of the second catalyst layer is in contact with the second face of the gas diffusion substrate;
(iii) first and second electrolyte layers each having a first and second face and wherein the first face of the first electrolyte layer is in contact with the second face of the first catalyst layer and the first face of the second electrolyte layer is in contact with the second face of the second catalyst layer;
(iv) third and fourth catalyst layers each having a first and second face and wherein the first face of the third catalyst layer is in contact with the second face of the first electrolyte layer and the first face of the fourth catalyst layer is in contact with the second face of the second electrolyte layer; and
(v) first and second porous current collecting means each having a thickness of less than 400μm, and each having a first and second face and wherein the first face of the first current collecting means is in contact with the second face of the third catalyst layer and the first face of the second current collecting means is in contact with the second face of the fourth catalyst layer.

It can immediately be seen that this MEA is equivalent to a pair of conventional MEAs, but with fewer components.

BRIEF DESCRIPTION OF THE DRAWINGS

FIG. 3 is a schematic drawing showing exemplary wall and channel dimensions of a carbon monolith suitable for forming the central gas diffusion substrate of an MEA according to the invention.

FIG. 4 shows corresponding polarisation and power density curves obtainable via use of an exemplary MEA according to the invention.

DETAILED DESCRIPTION OF THE INVENTION

Figure 1:
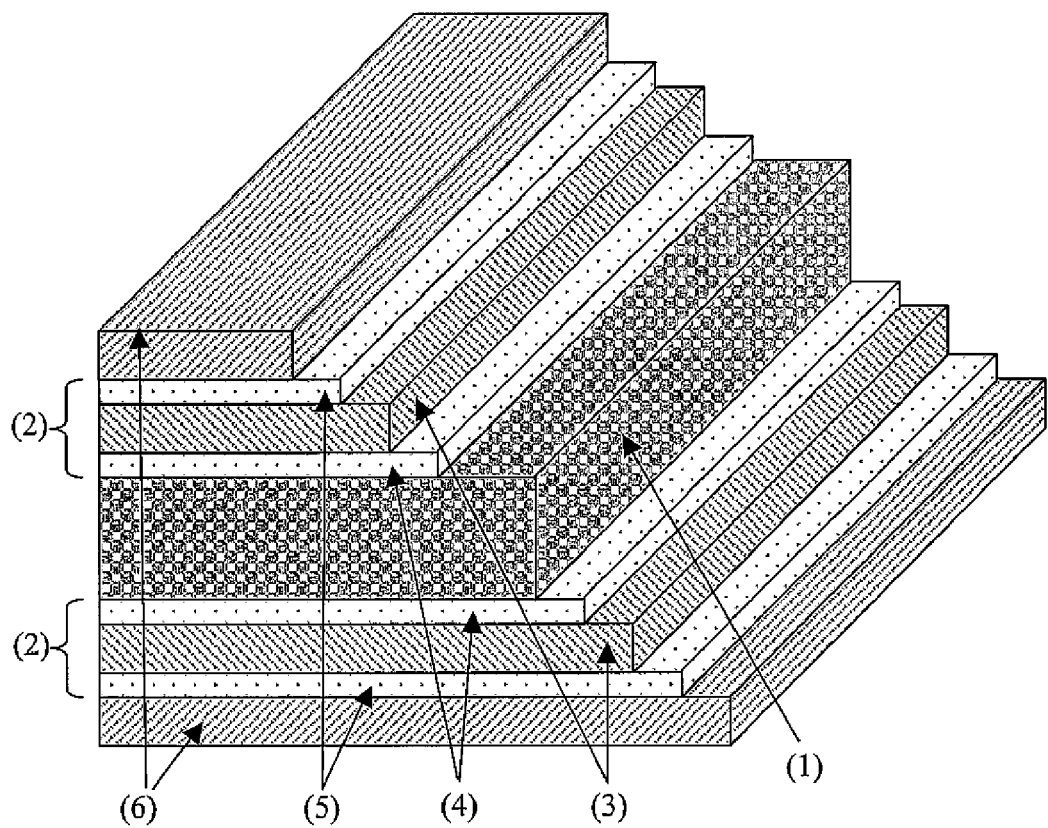
FIG. 1 is a schematic drawing of a planar MEA according to the invention.
Figure 2:
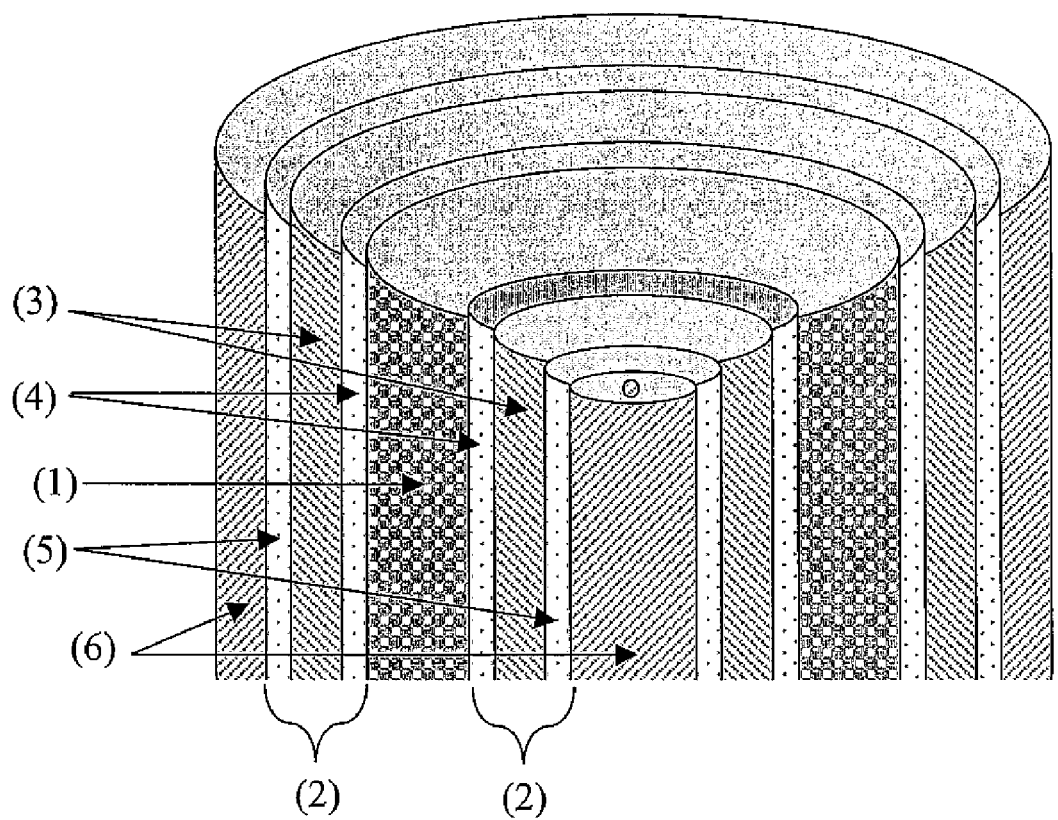
FIG. 2 is a schematic drawing of a tubular MEA according to the invention.

The central gas diffusion substrate may be either planar or tubular in design. FIG. 1 depicts an example of a planar structure and FIG. 2 an example of a tubular structure. In both Figures, (1) is the central gas diffusion substrate. Each face of the central gas diffusion substrate has a catalyst coated membrane (2) applied thereto. The catalyst coated membrane is composed of a first and second electrolyte (3), first and second catalyst layers (4) and third and fourth catalyst layers (5). Applied to each catalyst layer (5) is current collecting means (6).

In one embodiment, the central gas diffusion substrate is a porous conductive carbon structure. The structure may be provided with, or fittable to, a manifold means for conducting gas to the substrate, and sealed along side edges, or along side edges and a bottom edge remote from the gas entry point, to prevent gas or liquid losses and to force gas or liquid through the substrate to the catalyst layers. Such gas diffusion substrates are known per se as rigid or non-rigid carbon (or other conductive porous material) sheets, produced from woven or non-woven conductive fibres, or other conductive porous structures and may be based on carbon paper (e.g. Toray® paper available from Toray Industries, Japan or U105 or U107 paper available from Mitsubishi Rayon, Japan), woven carbon cloths (e.g. the MK series of carbon cloths available from Mitsubishi Chemicals, Japan) or non-woven carbon fibre webs (e.g. ELAT series of non-woven substrates available from E-TEK Inc, USA; H2315 series available from Freudenberg FCCT KG, Germany; or Sigracet® series available from SGL Technologies GmbH, Germany). The carbon paper, cloth or web is typically modified with a particulate material either embedded within the substrate or coated onto the planar faces, or a combination of both. The particulate material is typically a mixture of carbon black and a polymer such as polytetrafluoroethylene (PTFE). Suitably the gas diffusion substrates are between 100 and 300 µm thick. In some cases, there may be a layer of particulate material such as carbon black and PTFE on the faces of the gas diffusion substrates that contact the catalyst layers. Additionally, it is possible to conceive of satisfactory structures such as a porous carbon matrix surrounding channels to promote gas transport, such as carbon tubes in a carbon matrix. Such tubes may be similar to those disclosed in WO02/15308, or may extend down to carbon nanotubes, providing that the gas flow characteristics meet the requirements of the MEA. Another embodiment may incorporate a rigid porous carbon sheet made from particulate carbon or graphite which may or may not have integral gas supply channels. These are analogous to porous ceramic extruded filters such as used in diesel particulate filters for treating diesel engine exhaust.

Alternatively, the central gas diffusion substrate is a metal or graphite substrate with one or more grooves in both faces of the substrate. The grooves enable the transport and distribution of gas or liquid and are generally referred to as flow field grooves. Alternatively, the flow field grooves may traverse the thickness of the substrate.

Alternatively, the central gas diffusion substrate comprises at least two porous conductive layers having recesses formed therein and as described fiurther in US2007/0054175. The recesses are disposed in a pattern and when the layers are combined, the recesses at least partially overlap and form a channel structure for distribution of gases or liquids.

The remaining parts of the MEA structure are essentially conventional, or modified versions of conventional components.

In one embodiment, the first and second catalyst layers are the same and suitably act as anode catalyst layers and the third and fourth catalyst layers are the same and act as cathode catalyst layers. Alternatively, the first and second catalyst layers act as cathode catalyst layers and the third and fourth catalyst layer act as anode layers.

The catalyst layers comprise an electrocatalyst which may be a finely divided metal powder (metal black), or may be a supported catalyst wherein small metal particles are dispersed on electrically conducting particulate carbon supports. The electrocatalyst metal is suitably selected from
  (i) the platinum group metals (platinum, palladium, rhodium, ruthenium, iridium and osmium),
  (ii) gold or silver,
  (iii) a base metal,
or an alloy or mixture comprising one or more of these metals or their oxides. The preferred electrocatalyst metal is platinum, which may be alloyed with other precious metals such as ruthenium, or base metals such as molybdenum or tungsten. If the electrocatalyst is a supported catalyst, the loading of metal particles on the carbon support material is suitably in the range 10-100 wt %, preferably 15-75 wt %.

The electrocatalyst layers suitably comprise other components, such as ion-conducting polymer, which is included to improve the ionic conductivity within the layer. To incorporate the layers into the membrane electrode assembly, the layers can be formed on the gas diffusion substrates (forming a gas diffusion electrode), or the layers can be formed directly on the electrolyte membrane (forming a catalyst coated membrane). Suitably, an electrocatalyst ink is formed as described for example in EP 0 731 520 and the ink is then applied to the membrane or gas diffusion substrate by a method known to those skilled in the art, for example screen printing, ink-jet printing, rolling, filtration vacuum deposition, spray deposition, casting, extrusion etc.

The electrolyte may be any ion-conducting electrolyte, for example, any type of ion-conducting membrane known to those skilled in the art. In state of the art membrane electrode assemblies, the membranes are often based on perfluorinated sulphonic acid materials such as Nafion® (DuPont), Flemion® (Asahi Glass) and Aciplex® (Asahi Kasei). The membrane may be a composite membrane, containing the proton-conducting material and other materials that confer properties such as mechanical strength. For example, the membrane may comprise a proton-conducting membrane and a matrix of silica fibres, as described in EP 0 875 524 or the membrane may comprise an expanded PTFE substrate. The membrane is suitably less than 200 µm thick, preferably less than 50 µm.

The current is desirably taken from the second faces or from the edges of each of the current collecting means, but from the edge of the central first conductive gas diffusion substrate, and this is believed to minimise resistive losses in the MEA systems of the present invention.

The porous current collecting means is less than 400 µm and may be an array, grid or mesh of conductive metal wires, or may be a metal or conductive non-metal foam. Alternatively, the current collecting means may be a conventional gas diffusion substrate produced from woven or non-woven conductive fibres, or other conductive porous structures and as described in more detail above. It is simply necessary that the current collecting means is effective to transmit current and permit the flow of fuel or, preferably, oxidant, to the second catalyst layer.

The particular components chosen are not critical to the invention, and the skilled person can easily select appropriate components for his particular requirements.

The preferred method of construction incorporates the use of a catalyst coated membrane or a gas diffusion electrode. However, other methods may be used by the skilled person.

The main advantage of the present invention, is that it is possible to obtain the output of two MEAs from a construction that is thinner by one gas diffusion layer and two flow field plates, saving a significant percentage of the cell mass and volume, than two separate conventional MEAs.

The novel MEA structure of the present invention, either planar or tubular, permits the construction of a lower weight and volume fuel cell compared to conventional constructions, which may be of greater benefit for smaller fuel cell systems being developed for portable applications. In the case of a planar MEA, it may be square or rectangular, or may be of disc shape or any other shape as appropriate for the application. A fuel cell incorporating an MEA according to the present invention may even be flexible, subject to satisfactory engineering of all the components. Operation of such a fuel cell may be passive (relying on gravity and natural convection to circulate fuel and air) or semi-passive (using a lower power consumption fan to help circulation of fuel and air), which her simplifies its use as a power source. Water produced during operation may be removed using a valve and purge means, or recirculated by back-diffusion to the fuel electrode, or circulated to the fuel feed for the purpose of humidifying it. Such a fuel cell may be self-sufficient in water.

It is preferred to use hydrogen or a liquid hydrocarbon fuel, for example methanol, ethanol or an aqueous sodium borohydride solution hydrogen as the fuel. Preferably, air is used as the oxidant.

Although a single MEA according to the present invention can form a fuel cell, with a high current density and corresponding power density, it may be desirable to form a stack. The stack may comprise a substantially planar array of fuel cells or may form a small stack from MEAs bonded together in conventional manner, or any other arrangement as known to those skilled in the art. The actual stack construction will depend upon voltage required and other requirements. One or more convertors or voltage steppers may be used to provide the desired voltage and current for any particular application, as is known in the art.

The first uses of fuel cells incorporating the MEAs of the present invention are expected to be in alternative power generation devices to batteries, such as in small computers (lap-tops, notebooks, PDAs), personal communications such as mobile (cell) phones and radios, personal entertainment devices and the like, but many other uses can be contemplated by the skilled person. The present invention is believed to offer fuel cell designers and engineers usefully increased options to meet the requirements of devices requiring power, and we do not wish to be limited to any particular design.

The invention will now be illustrated further by way of example only, which is not intended to be limiting thereof.

The central, conductive gas-distributing component of the MEA, with gas flow channels, was made from porous carbon monoliths with a typical thickness of 900 μm and is shown in FIG. 3. The monoliths were made by extrusion through a single layer die using powdered phenolic resin dough. The "green" monolith was carbonised at 800° C. under a $CO_2$ atmosphere and then high-temperature (1500° C.) heat-treated under a helium atmosphere.

A monolith assembly was prepared with three pieces of monolith (each approx. 1.4 cm×5.5 cm). The monoliths were placed side by side, parallel to one another and electrically connected edge-to-edge using silver-loaded epoxy resin to create a structure approximately 4.2×5.5×0.09 cm. Copper wires were placed between the monoliths, within the silver-loaded epoxy, in order to form electrical contacts for the anode.

The membrane used in the experiments was SH-30 supplied by Asahi Glass (Japan). Aqueous catalyst ink containing Pt on carbon and ionomer was coated on PTFE and transferred onto both sides of the membrane at 150° C., forming a catalyst coated membrane (CCM) structure. The Pt loading in these experiments was between 0.45 and 0.65 mg/cm$^2$. The same catalyst was used on the anode and on the cathode. Toray® TGP-H-60 carbon paper with a hydrophobic microporous layer (containing ionomer, carbon and PTFE) was used as a gas diffusion layer substrate on the outer cathode face.

One CCM was positioned on each side of the monolith assembly. A thermo-plastic edge protection material (impermeable to $H_2$), as described in WO2006/032894, with an open window of 3 cm×3 cm was bonded on both sides of the CCM at 90° C. One cathode substrate and CCM was then hot-pressed to each side of the monolith assembly at 150° C. The CCM-monolith assembly was placed in the test cell and compressed with a graphite frame with an open area in order to allow free access of air. The cathodes were fully air-breathing, i.e. no outer air-blower was used. The electrical contacts to the cathodes were formed through the graphite frame, where it contacted the carbon paper.

For the actual experiments, the monolith channels were blocked at one end (dead-ended) and hydrogen was supplied to the other end from a commercially available metal hydride hydrogen storage device (Udomi, Germany). A polarisation curve is shown in FIG. 4, together with the corresponding power density curve.

The invention claimed is:

1. An MEA comprising:
    (i) a central first conductive gas diffusion substrate having a first face and a second face;
    (ii) first and second catalyst layers each having a first and second face and wherein the first face of the first catalyst layer is in contact with the first face of the gas diffusion substrate and the first face of the second catalyst layer is in contact with the second face of the gas diffusion substrate;
    (iii) first and second electrolyte layers each having a first and second face and wherein the first face of the first electrolyte layer is in contact with the second face of the first catalyst layer and the first face of the second electrolyte layer is in contact with the second face of the second catalyst layer;
    (iv) third and fourth catalyst layers each having a first and second face and wherein the first face of the third catalyst layer is in contact with the second face of the first electrolyte layer and the first face of the fourth catalyst layer is in contact with the second face of the second electrolyte layer; and
    (v) first and second porous current collecting means each having a thickness of less than 400 μm, and each having a first and second face and wherein the first face of the first current collecting means is in contact with the second face of the third catalyst layer and the first face of the second current collecting means is in contact with the second face of the fourth catalyst layer;
    wherein the first and second catalyst layers are both anode catalyst layers and the third and fourth catalyst layers are both cathode catalyst layers.

2. An MEA according to claim 1 wherein the central gas diffusion substrate is planar.

3. An MEA according to claim 1 wherein the central gas diffusion substrate is tubular.

4. An MEA according to claim 1 wherein the central gas diffusion substrate is a porous conductive carbon structure.

5. An MEA according to claim 4 wherein the porous conductive carbon structure is a rigid or non-rigid fibrous or particulate carbon component.

6. An MEA according to claim 4 wherein the porous conductive carbon structure has integral gas distribution means.

7. An MEA according to claim 1 wherein the central gas diffusion substrate is a metal or graphite substrate with one or more grooves in the first and second faces of the substrate.

8. An MEA according to claim 1 wherein the central gas diffusion substrate comprises at least two porous conductive layers having recesses formed therein.

9. An MEA according to claim 1 wherein the current collecting means is an array, grid or mesh of conductive metal wires or is a metal or conductive non-metal foam.

10. An MEA according to claim 1 wherein the current collecting means is a gas diffusion substrate produced from woven or non-woven conduction fibres, or other conductive porous structure.

11. A fuel cell incorporating one or more MEAs according to claim 1.

12. A fuel cell according to claim 11, capable of operating on hydrogen as the fuel.

13. A fuel cell according to claim 11, capable of operating on methanol or a sodium borohydride solution.

14. An MEA comprising:
   (i) a central first conductive gas diffusion substrate having a first face and a second face;
   (ii) first and second catalyst layers each having a first and second face and wherein the first face of the first catalyst layer is in contact with the first face of the gas diffusion substrate and the first face of the second catalyst layer is in contact with the second face of the gas diffusion substrate;
   (iii) first and second electrolyte layers each having a first and second face and wherein the first face of the first electrolyte layer is in contact with the second face of the first catalyst layer and the first face of the second electrolyte layer is in contact with the second face of the second catalyst layer;
   (iv) third and fourth catalyst layers each having a first and second face and wherein the first face of the third catalyst layer is in contact with the second face of the first electrolyte layer and the first face of the fourth catalyst layer is in contact with the second face of the second electrolyte layer; and
   (v) first and second porous current collecting means each having a thickness of less than 400 pm, and each having a first and second face and wherein the first face of the first current collecting means is in contact with the second face of the third catalyst layer and the first face of the second current collecting means is in contact with the second face of the fourth catalyst layer;

wherein the first and second catalyst layers are both cathode catalyst layers and the third and fourth catalyst layers are both anode catalyst layers.

15. An MEA according to claim 14 wherein the central gas diffusion substrate is planar.

16. An MEA according to claim 14, wherein the central gas diffusion substrate is tubular.

17. An MEA according to claim 14 wherein the central gas diffusion substrate is a porous conductive carbon structure.

18. An MEA according to claim 17 wherein the porous conductive carbon structure is a rigid or non-rigid fibrous or particulate carbon component.

19. An MEA according to claim 17 wherein the porous conductive carbon structure has integral gas distribution means.

20. An MEA according to claim 14 wherein the central gas diffusion substrate is a metal or graphite substrate with one or more grooves in the first and second faces of the substrate.

21. An MEA according to claim 14 wherein the central gas diffusion substrate comprises at least two porous conductive layers having recesses formed therein.

22. An MEA according to claim 14 wherein the current collecting means is an array, grid or mesh of conductive metal wires or is a metal or conductive non-metal foam.

23. An MEA according to claim 14 wherein the current collecting means is a gas diffusion substrate produced from woven or non-woven conductive fibres, or other conductive porous structure.

24. A fuel cell incorporating one or more MEAS according to claim 14.

25. A fuel cell according to claim 24, capable of operating on hydrogen as the fuel.

26. A fuel cell according to claim 24, capable of operating on methanol or a sodium borohydride solution.

* * * * *